June 29, 1948.  A. R. FRIBERG  2,444,191
APPARATUS FOR LINING BRAKES
Filed Sept. 9, 1946
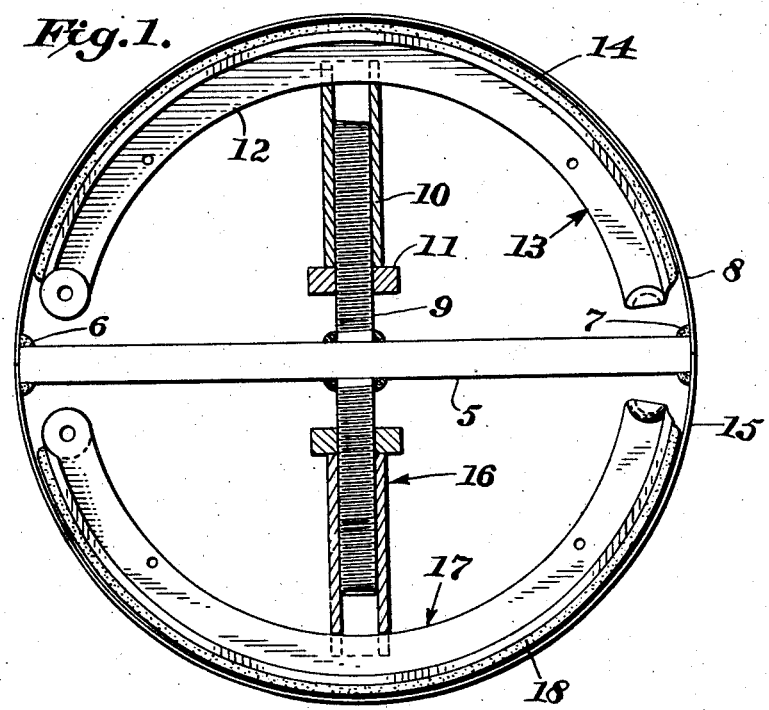
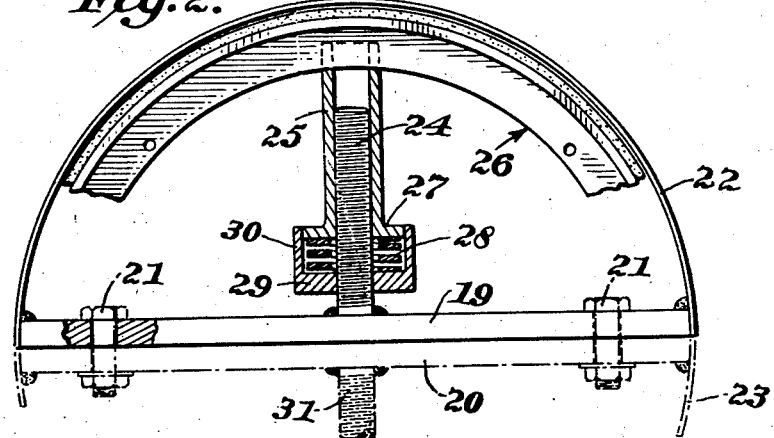
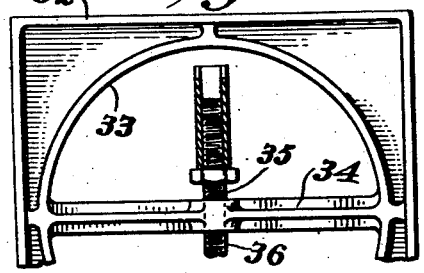
Inventor:
Alger R. Friberg,
Attorneys.

Patented June 29, 1948

2,444,191

UNITED STATES PATENT OFFICE 2,444,191

APPARATUS FOR LINING BRAKES

Alger R. Friberg, Beverly Hills, Calif.

Application September 9, 1946, Serial No. 695,643

4 Claims. (Cl. 154—1)

This invention relates to apparatus for applying liners to brake shoes of the internal type and, in particular, to the adhesive application of the liners to the shoes.

The desirability of adhesively applied liners has been recognized heretofore but, so far as I am aware, no entirely satisfactory apparatus for applying the liners has been devised. The liner should be held against the face of the shoe with substantial pressure while the adhesive is setting but no means has heretofore been devised which would apply the pressure in a manner to provide a drum engaging face of true and proper arcuateness throughout, or without developing slipping strains between the shoe and liner. The object of the present invention is to correct these disabilities of the prior art and to provide means for the precision application of liners to shoes. To this end, the invention comprises apparatus in the nature of a press wherein the shoe is utilized as a die in cooperation with a bed, which may be in the form of a band or block, the bed having an arched surface curved throughout on the radius of the drum interior, and comprises means for forcing the shoe radially toward the bed and against a liner to compress the same uniformly during the setting of an adhesive which is present between the liner and shoe. The adhesive may be of any suitable nature, for example, a synthetic resin, and may be either hot or cold setting although ordinarily a hot setting composition is preferred.

The invention is shown in illustrative embodiment in the accompanying drawing in which Figure 1 is an elevation, partly in section, of the new apparatus, Figure 2 is a view similar to that of Figure 1 showing modifications, and Figure 3 is a view similar to Figure 1 showing a further embodiment.

In Figure 1, reference numeral 5 designates a rigid bar having ends curved on the radius of the interior surface of the drum for which a shoe is to be lined and the length of the bar is the same as the diameter of the drum. Fixed to the ends of the bar, as by welding at 6 and 7, are the ends of a metal band 8 whose width is at least as great as that of the liner to be applied. Its length is such that its inside surface is on the exact radius of the drum in question, and this length should not be greater than an arc of 180°. The band may approximately be of 16 gauge spring steel rolled to the proper arc.

Welded to the bar 5 at its exact center and projecting on the central radius of the arc of band 8 is a threaded stem 9 whose outer end is slidingly received in a sleeve 10 and an actuator nut 11 is threaded on the stem below the sleeve. The other end of the sleeve is notched, as indicated, so as to be adapted to engage the flange 12 of the shoe 13 centrally thereof. The shoe has a convexly curved surface substantially concentric with the concavely curved surface of the bed. With the nut threaded down, the shoe, with a liner 14 and interposed adhesive on its curved face, is engaged with the sleeve and held in register with the band, whereupon the nut is threaded outwardly so that the shoe is moved radially toward the band to compress the liner uniformly between the shoe and band. The arc of the latter remains constant so that there is no tendency to taper the ends of the liner and, due to the more or less floating support of the shoe on sleeve 10, the shoe accommodates itself to the arc of the band or bed so that a precision effect on the band is secured.

As a matter of convenience, another band 15, exactly like band 8, may be secured to the bar 5, together with expansible means 16, like those at the other side of the bar, for engagement with a shoe 17 carrying a liner 18. In this manner the bar 5 performs a double duty. In the case of a heat setting adhesive, the entire assembly is placed in a suitably heated oven for the required period.

In Figure 2, individual bars 19 and 20 are secured together by bolts 21 and have independently secured thereto the ends of bands 22 and 23, the arrangement being essentially the same as in Figure 1. Projecting centrally from bar 19 is a threaded stem 24 on which is slidable a sleeve 25 having a notched end engaging the shoe 26, the inner end of the sleeve having an annular flange 27 which is received in the circular cavity 28 of a cup-like nut 29. A compression spring 30 is interposed between the flange and nut. The force of this spring is so chosen that when it is fully compressed, a known pressure is applied to the shoe. Similar expansible means, of which the stem member appears at 31, may be associated with bar 20 and band 23.

The forms of Figures 1 and 2 are particularly designed for use in the application of cured liners. In the case of uncured liners, I prefer the form shown in Figure 3. In this figure, a block or casting 32 has an arched bed surface 33 exactly on the drum radius and an integral rigid bar 34 is disposed as a diameter. The expansible means are indicated as being the same as in Figure 1 except that the stems 35 and 36 are threaded in the opposite ends of a threaded bore of bar 34. In the case of a rigid bed such as is afforded by the casting, the arch could, of course, be greater than 180°, but this would be without advantage.

In either form of the invention, the arc of the bed may be less than 180° so long as the bar has the exact effective length of the chord of the arc and sufficient working space is provided between the bar and the bed. In the first form the arc must not be more than 180°, as previously mentioned, and when the arc is maximum its chord is, of course, a diameter.

It will be understood that variations in the form and relation of parts other than those disclosed are possible and are contemplated under the invention as defined in the following claims.

I claim:

1. Apparatus for applying a liner to an internal brake shoe having a convexly curved face, comprising a rigid bar member, a bed member in rigid connection with said bar member at the ends thereof, said bed member having a substantially semi-cylindrical surface between said points which is concavely curved throughout on an arc of the same radius as the inner surface of the drum with which the shoe is to be associated, and expansible means fixed to said bar member at the center thereof on the central radius of said arc and adapted to engage the shoe centrally thereof to force the shoe radially toward said bed whereby to compress the liner uniformly between said bed and shoe during the setting of an adhesive present between the liner and shoe, said bar member being positioned substantially diametrically with respect to the bed member, to prevent radial contraction of the end portion of the bed member and the application of undue compression to the end portions of the liner.

2. Apparatus according to claim 1 wherein said expansible means comprises a threaded stem member and a sleeve member slidable on the stem member, one of said members being rigidly fixed to said bar member and the other being formed for engagement with the shoe, and an actuator nut on said stem member.

3. Apparatus for applying a liner to an internal brake shoe having a convexly curved face, comprising a rigid bar member whose length is the same as the diameter of the interior of the drum with which the shoe is to be associated, a substantially semi-cylindrical arched band having its ends secured to the ends of said bar member and the arc of its inner surface having the same radius as the said drum interior, and expansible means fixed to said bar member at the center thereof on the central radius of said arc and adapted to engage the shoe centrally thereof to force the shoe radially toward said band whereby to compress the liner uniformly between said band and shoe during the setting of an adhesive present between the liner and the shoe, said bar serving to prevent radial contraction of the band adjacent the ends thereof under the influence of the force of said expansible means and thereby to prevent the application of excessive compression forces to the end portions of the liner.

4. Apparatus for applying a liner to an internal brake shoe having a convexly curved face, comprising an arched band having an inner arc whose radius is the same as the radius of the interior of the drum with which the shoe is to be associated, a rigid bar member whose length is that of a chord of said band, the ends of said band being secured to the ends of said bar member, with said bar positioned with respect to the band to restrain the band against radially inward movement, and expansible means fixed to said bar member at the center thereof on the central radius of said arc and adapted to engage the shoe centrally thereof to force the shoe radially toward said band whereby to compress the liner uniformly from end to end between said band and shoe during the setting of an adhesive present between the liner and the shoe.

ALGER R. FRIBERG.

REFERENCES CITED

The following references are of record in the file of this patent:

UNITED STATES PATENTS

| Number | Name | Date |
|---|---|---|
| 10,465 | Anthony | Jan. 31, 1854 |
| 2,355,949 | Boutwell | Aug. 15, 1944 |
| 2,358,483 | Tilden | Sept. 19, 1944 |